United States Patent
Khatri et al.

(10) Patent No.: US 7,487,345 B2
(45) Date of Patent: Feb. 3, 2009

(54) METHOD OF COMPARING BUILD CAPABILITY FLAGS OF REPLACEMENT BIOS WITH BOOT CAPABILITY FLAGS OF CURRENT BIOS TO DETERMINE COMPATIBILITY BETWEEN BIOS REVISIONS AND INSTALLED HARDWARE DURING FLASH UPDATE

(75) Inventors: Mukund Purshottam Khatri, Austin, TX (US); Foad Askari, Round Rock, TX (US); George Mathew, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 465 days.

(21) Appl. No.: 10/683,340

(22) Filed: Oct. 10, 2003

(65) Prior Publication Data

US 2005/0081024 A1 Apr. 14, 2005

(51) Int. Cl.
*G06F 9/00* (2006.01)
*G06F 1/24* (2006.01)
(52) U.S. Cl. .......................................... 713/100; 713/2
(58) Field of Classification Search ................ 713/2, 713/100; 717/168
See application file for complete search history.

(56) References Cited

U.S. PATENT DOCUMENTS

| | | | | |
|---|---|---|---|---|
| 5,247,659 A | * | 9/1993 | Curran et al. .................... | 713/1 |
| 5,355,489 A | * | 10/1994 | Bealkowski et al. ............ | 713/2 |
| 5,388,267 A | | 2/1995 | Chan et al. .................. | 395/700 |
| 5,586,304 A | * | 12/1996 | Stupek, Jr. et al. ........... | 717/170 |
| 5,586,324 A | * | 12/1996 | Sato et al. ...................... | 713/2 |
| 5,671,413 A | * | 9/1997 | Shipman et al. ................ | 713/2 |
| 5,835,761 A | | 11/1998 | Ishii et al. .................... | 395/653 |

(Continued)

FOREIGN PATENT DOCUMENTS

| | | |
|---|---|---|
| EP | 0 703 531 A1 | 9/1995 |
| EP | 1043656 A2 | 10/2000 |
| EP | 1072975 A2 | 1/2001 |
| SG | 200405543-0 | 10/2003 |

OTHER PUBLICATIONS

English translation of Chinese Patent Application No. CN 1477511 A.

*Primary Examiner*—Chun Cao
(74) *Attorney, Agent, or Firm*—Baker Botts L.L.P.

(57) ABSTRACT

The present invention provides a BIOS having two sets of flags. The first set of flags is the build capability flags. The second set of flags is the boot capability flags. Each of the flags can be stored as a value through the combination of bits that make up the flags and are stored in, for example, a register. The one or more values that make up the build capability flags can be compared to the one or more values that make up the boot capability flags. The current BIOS is updateable with a BIOS version that also has a build capability flag and a current boot capability flag. More specifically, the BIOS is updateable if the replacement build capability flags enable the booting of an information system having current build capability. For example, an update of the BIOS will only occur if the value of the updated build capability flags is greater than or equal to the value of the current boot capability flags. The comparison ensures that the features needed for current operation of the information handling system are present in the updated BIOS, and thus, that the updated BIOS will not preclude operation of the information handling system as it is currently configured.

27 Claims, 3 Drawing Sheets

U.S. PATENT DOCUMENTS

| | | | |
|---|---|---|---|
| 5,854,905 A | 12/1998 | Garney | 395/284 |
| 5,864,698 A * | 1/1999 | Krau et al. | 713/2 |
| 5,964,873 A * | 10/1999 | Choi | 713/2 |
| 6,003,130 A * | 12/1999 | Anderson | 713/2 |
| 6,115,813 A | 9/2000 | Hobson et al. | 713/1 |
| 6,128,694 A | 10/2000 | Decker et al. | 711/103 |
| 6,161,177 A * | 12/2000 | Anderson | 713/2 |
| 6,170,056 B1 | 1/2001 | Sidie | 710/220 |
| 6,487,656 B1 | 11/2002 | Kim et al. | 713/2 |
| 6,581,159 B1 | 6/2003 | Nevis et al. | 713/2 |
| 6,732,261 B2 * | 5/2004 | Chalmers et al. | 713/1 |
| 6,732,267 B1 * | 5/2004 | Wu et al. | 713/100 |
| 6,754,817 B2 * | 6/2004 | Khatri et al. | 713/1 |
| 6,754,828 B1 * | 6/2004 | Marisetty et al. | 726/2 |
| 6,944,758 B2 * | 9/2005 | Lin | 713/2 |
| 6,990,577 B2 * | 1/2006 | Autry | 713/100 |
| 7,000,101 B2 * | 2/2006 | Wu et al. | 713/1 |
| 7,117,348 B2 * | 10/2006 | Holmberg et al. | 713/1 |
| 2002/0133695 A1 | 9/2002 | Khatri et al. | 713/1 |
| 2003/0033515 A1 | 2/2003 | Autry | 713/100 |
| 2003/0056090 A1 * | 3/2003 | Khanna et al. | 713/1 |
| 2003/0074657 A1 * | 4/2003 | Bramley | 717/168 |
| 2003/0120913 A1 | 6/2003 | Wu et al. | 713/100 |
| 2003/0167354 A1 * | 9/2003 | Peppers et al. | 709/327 |
| 2004/0030877 A1 * | 2/2004 | Frid | 713/1 |

\* cited by examiner

METHOD OF COMPARING BUILD CAPABILITY FLAGS OF REPLACEMENT BIOS WITH BOOT CAPABILITY FLAGS OF CURRENT BIOS TO DETERMINE COMPATIBILITY BETWEEN BIOS REVISIONS AND INSTALLED HARDWARE DURING FLASH UPDATE

BACKGROUND OF THE INVENTION TECHNOLOGY

1. Field of the Invention

The present invention is related to information handling systems, and more specifically, to controlling the ability to back-flash a BIOS when new features are present on the information handling system.

2. Description of the Related Art

As the value and the use of information continue to increase, individuals and businesses seek additional ways to process and store information. One option available to users is information handling systems. An information handling system generally processes, compiles, stores and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, redundant array of independent disks ("RAID") system and telecommunications switch.

Most computer systems include a basic input output system (commonly referred to as "BIOS") that provides an interface between the operating system kernel and the underlying hardware. The kernel is the portion of the operating system that is closest to the application software. The kernel is responsible, typically, for process control, memory management, file management and peripheral support. The kernel passes commands from the application software to the BIOS for translation into hardware-specific requests.

BIOS is firmware for personal computers ("PC's") that is responsible for initializing when it is first switched on or reset. The major task of the BIOS is to load and begin execution of the operating system that is normally stored on the computer's hard disk. The BIOS also provides a low level interface to the peripheral devices of the computer system. The BIOS is stored in a non-volatile memory that can be updated, or in a read-only-memory ("ROM").

While the BIOS is responsible for checking of the system at startup time, a particular version of the BIOS does not necessarily support all of the hardware's capabilities. BIOS designers cannot conceive of all of the hardware that may be added to the system at a later date. For many years, BIOS code has been made extensible through the use of flash memory chips. This ability to program the BIOS after it has been installed forestalls the obsolescence of BIOS chips as new hardware features are installed. In this way, the BIOS can be updated by modem, network, or directly from a diskette to bring the BIOS code in line with new hardware capabilities.

In the case of servers, new features such as new CPU steppings, new memory sizes, new flash type and architectures are required to be supported post-installation and throughout the life of the product via BIOS updates. In the past, if problems were encountered with the updated BIOS, system operators would back-flash to an older BIOS revision, and thus incur incompatibilities with newer features that were installed on the server. In some instances, back-flashing can prevent the server from booting at all, with obvious consequences.

For example, consider the case of a platform currently shipping with DELL® A01 BIOS, which is available from Dell Inc. of Round Rock, Tex. The BIOS, then, may get revised to support, for example, new 2GB dual in-line memory modules ("DIMMs") or a new stepping of processor that requires new microcode update patches, or support for a new flash part due to part availability. It would then be desirable for the user to implement the updated DELL® A02 BIOS to support the new features. As required, a customer who gets a system with A02 BIOS, with one or all of these enhancements, would need to be blocked from back-flashing to A01 BIOS since A01 BIOS does not support these new features or enhancements and back-flashing could result in an unusable system, for example, there would be no memory or corrupted flash due to a new architecture of flash part.

Simply preventing all back-flashes, however, prevents any customer, even one who does not have any of the new technologies installed, or an existing customer who upgrades from A01 to A02 BIOS, from back-flashing to A01 BIOS altogether. Therefore, a problem exists, and a solution is required for determining whether a BIOS back-flash should be enabled on a computer system.

SUMMARY OF THE INVENTION

The present invention remedies the shortcomings of the prior art by providing a method, system and apparatus, in an information handling system, for using feature flags to determine the compatibility of hardware (typically, newly installed hardware) and BIOS revisions during the flash update of the BIOS.

The present invention is implemented on an information handling system having one or more central processing units that is operative with a main memory. The central processing unit can be a microcontroller, or a microcomputer, or microprocessor. The information handling system includes a present BIOS that is operative with the central processing unit that hosts the operating system kernel and, perhaps, other central processing units. The BIOS of the present invention has one or more build capability flags and one or more current boot capability flags. In a BIOS updating operation, an update process is used to update a present BIOS to a replacement BIOS. During the update process, the build capability flags of the replacement BIOS can be compared to the boot capability flags of the present BIOS to determine if the replacement BIOS can be used in place of the present BIOS.

The update process can perform the comparison (check) by, for example, grouping the various flags into integer values, and comparing the values via some mathematical operation (such as subtraction) to obtain a binary value that can be quickly scanned for incompatibilities. Similarly, the two values can be compared and the update allowed if the replacement BIOS value is, for example, greater than, equal to, or less than the value of the present BIOS. The size of the integer value can be tailored to the particular information system, such as 8, 16, 32, 64, or 128 bits or more (or less).

Other technical advantages of the present disclosure will be readily apparent to one skilled in the art from the following figures, descriptions and claims. Various embodiments of the invention obtain only a subset of the advantages set forth. No one advantage is critical to the invention.

BRIEF DESCRIPTION OF THE DRAWINGS

A more complete understanding of the present disclosure and advantages thereof may be acquired by referring to the following description taken in conjunction with the accompanying drawings wherein.

Figure 1:
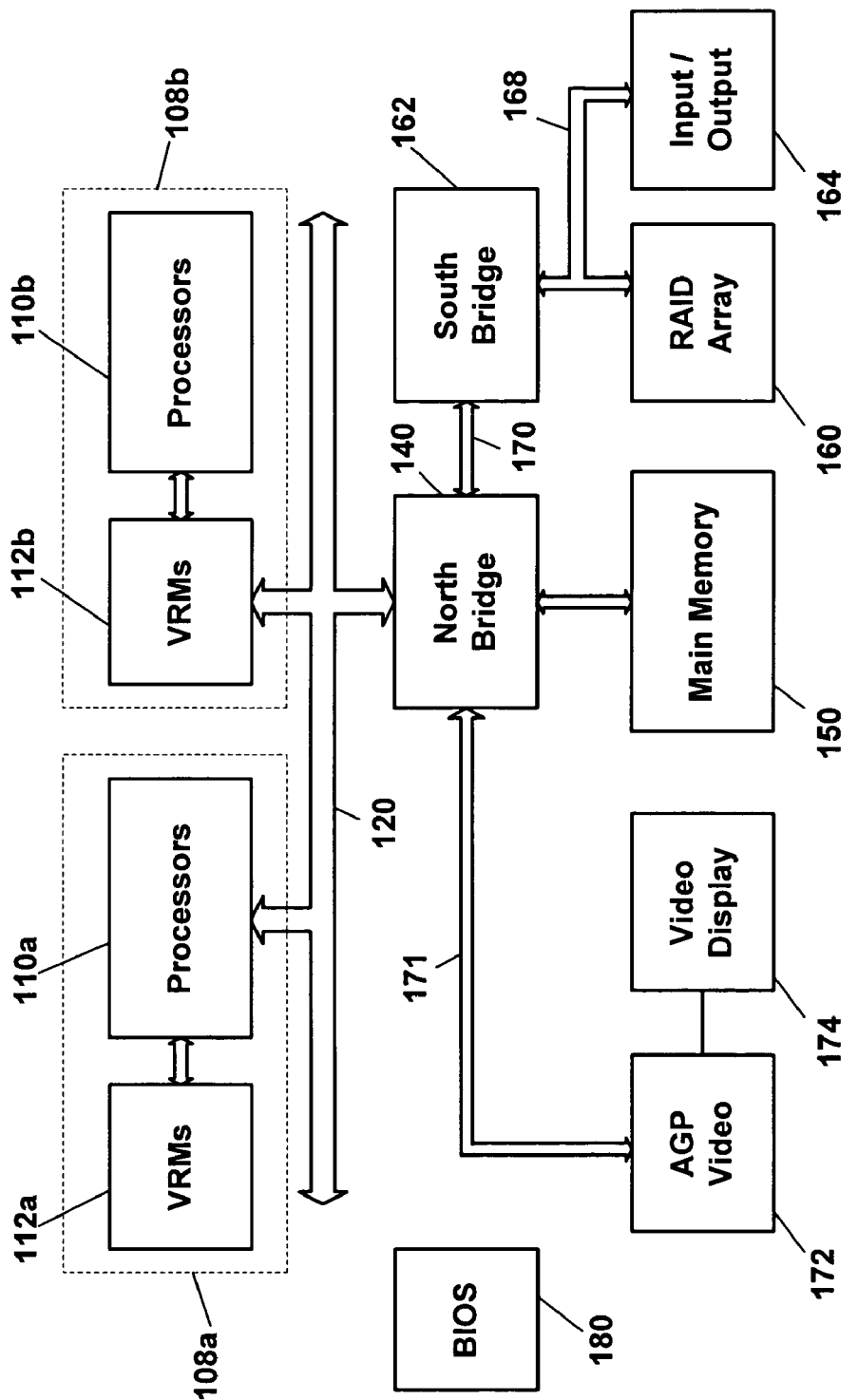
FIG. 1 is a schematic block diagram of an exemplary embodiment of an information handling system according to the present invention.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

The invention proposes to solve the problem in the prior art by employing a system, apparatus and method that only block the flash updates that would prevent operation of the information handling system. In other words, back-flashing would be restricted when it would render the system unusable or unstable. The present invention uses a BIOS capability/feature flag to identify a new capability that is added to the information handling system. In one embodiment, each capability or feature is given a BIOS capability flag. The BIOS capability flag can be referenced by a process, such as a software process, to determine whether or not a back-flash to an older BIOS version is to be permitted. For purposes of this disclosure, the BIOS is defined as any updateable firmware that is responsible for initializing a microcontroller or microprocessor-based platform, system, or subsystem.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU"), hardware or software control logic, ROM, and/or other types of nonvolatile memory. Additional components of the information handling system may include one or more disk drives, one or more network ports for communicating with external devices as well as various input and output ("I/O") devices, such as a keyboard, a mouse, and a video display. The information handling system may also include one or more buses operable to transmit communications among the various hardware components.

Referring now to the drawings, the details of an exemplary embodiment of the present invention are schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board ("PCB") (not shown) and communicating data and control signals therebetween over signal buses. In one embodiment, the information handling system is a computer system. The information handling system, generally referenced by the numeral 100, comprises processors 110 and associated voltage regulator modules ("VRMs") 112 configured as a processor node 108. There may be one or more processor nodes 108 (two nodes 108a and 108b are illustrated). A north bridge 140, which may also be referred to as a "memory controller hub" or a "memory controller," is coupled to a main system memory 150. The north bridge 140 is coupled to the processors 110 via the host bus 120. The north bridge 140 is generally considered an application specific chip set that provides connectivity to various buses, and integrates other system functions such as memory interface. For example, an INTEL® 820E and/or 815E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170 and AGP bus 171, the AGP bus 171 being coupled to the AGP video 172 and/or the video display 174. The second bus may also comprise other industry standard buses or proprietary buses, e.g., ISA, SCSI, USB buses 168 through a south bridge (bus interface) 162. These secondary buses 168 may have their own interfaces and controllers, e.g., RAID storage system 160 and input/output interface(s) 164. Finally, a BIOS 180 is operative with the information handling system 100 as illustrated in FIG. 1.

The present invention uses BIOS capability/feature flags to define/identify new capabilities that are added to a platform, such as a server or workstation, once they have been manufactured. The BIOS will then use the information stored in the capability/feature flags to determine whether or not to prevent back-flashing to older BIOS revisions.

Figure 2:
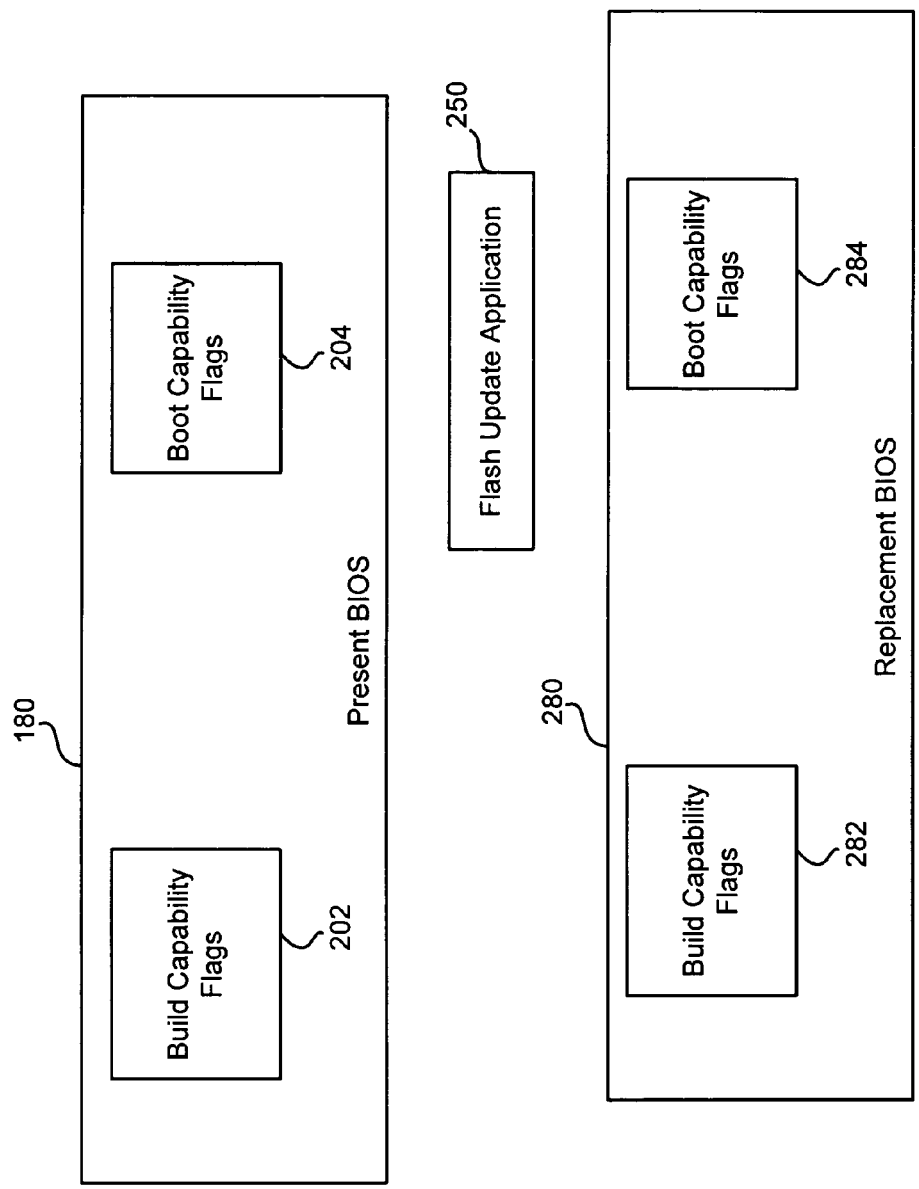
FIG. 2 is a block diagram illustrating a present BIOS and a replacement BIOS according to the teachings of the present invention.

In one embodiment of the present invention as illustrated in FIG. 2, there exists a set each of BIOS flags 202 and 204 of present BIOS 180. The first set of flags 202, referred to as build capability flags 202 in this disclosure, is created when a new BIOS revision is released. The build capability flags 202 contain a pre-defined value composed of, for example, 32-bits, for capability one or more flags, with each flag composed of one or more bits. In some embodiments, multiple pre-defined values could be used to add additional flags, and/or those extra flags can be contained within values of 8-bits, 16-bits, 64-bits, 128-bits, or other (greater, lesser, or intermediate) sizes. Moreover, other bit-lengths and values, or other techniques for grouping flags are usable with the present invention. The specific bit-length, value, and number of values depend upon the problem at hand, and not with the operation of the method or implementation of the present invention. Typically, the values for the build capability flags 202 do not change for that BIOS release. The values for the build capability flags 202 identify what new (post sale) features are supported in this BIOS 180 release. At the time of shipping from the factory, all of the bits of the build capability flags 202 would be initialized to 0 (zero) or some other initial value. When a new feature is added to the system 100 (after it was shipped from the factory), a bit within the build capability flags 202 would be set to indicate the addition of the new capability.

The second set of capability flags, called the boot capability flags 204, is generated when the system 100 invokes the power-on-self-test procedure ("POST"). The value of the present boot capability flags 204 is dynamic and reflects the current configuration of the system 100. The present boot capability flags 204 may or may not indicate the presence of all of the features associated with the present build capability flags 202 for that specific present BIOS 180.

For every BIOS revision released, there would be a defined list of features that are supported. The list of supported features would be reflected via the replacement build capability flags when the replacement BIOS version is released. For example, a 32-bit (DWORD) value could also be embedded in the flash ROM file or header such that the flash utility/application would be able to access this value for comparison purposes.

Referring again to FIG. 2, during each system boot, the POST procedure will update the present boot capability flags 204 with, for example, a 32-bit (DWORD) value, to reflect which of the "new features" that are supported by the present BIOS 180 that are currently incorporated within the system 100. The specific present boot capability flags 204 would be located in the run-time BIOS 180 for applications to query.

A flash update application/utility would only allow a replacement BIOS 280 to be implemented on the system 100 if the replacement build capability flags 282 of the to-be-flashed (replacement) BIOS 280 is equal to or greater than the present boot capability flags 204 of the present BIOS 180. The system 100 is provided with a flash update application 250. The flash update application 250 is used to determine if the flash update from the present BIOS 180 to the replacement BIOS 280 is workable, and, in some embodiments, to prevent the flash-update if the replacement BIOS is unworkable with the current system 100. In this illustrative embodiment, when the value of the replacement build capability flags 282 of the replacement BIOS 280 are greater than or equal to the value of the present boot capability flags 204 of the present BIOS 180, the new flash is indicated to support fully the installed hardware configuration and thus that the flash update is workable. The check between the replacement build capability flags 282 and the present boot capability flags 204 also allows the BIOS installation application 250 to report the error/incompatibility via appropriate means, such as, for example, a warning sound or screen message. It should be noted that other comparison arrangements, such as allowing update when a certain value is less than or equal to, or only less than, only equal to, or only greater than, are possible with the present invention and are equivalent to the illustrative example.

Figure 3:
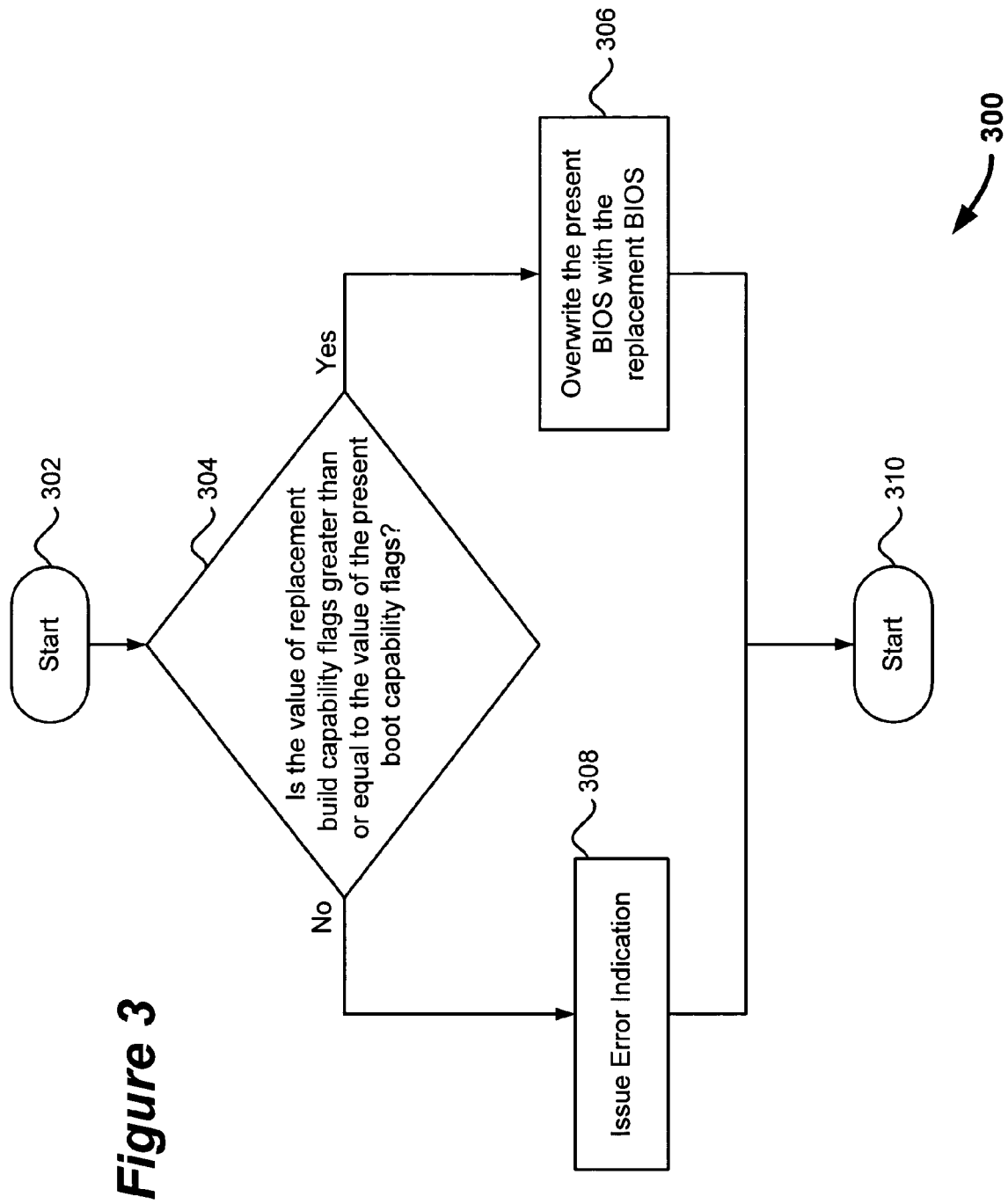
FIG. 3 is a flowchart illustrating an exemplary embodiment of the method of the present invention.

The operation of the flash update application 250 is illustrated in FIG. 3. The method starts with the attempt to install a replacement BIOS over the present BIOS in step 302. In step 304, a check is performed to determine whether the replacement BIOS is able to take the place of the present BIOS. The check of step 304 can be accomplished in a number of ways. One way is to have the various flags arranged as a value in, for example, a 32-bit register. Then the comparison step can simply be an operation performed on the two registers, one register for the present boot capability flag value, and one register for the replacement build capability flag value. For example, a comparison can be made to determine if the value of the replacement build capability flag is greater than, or equal to, the value of the present boot capability flag, as illustrated in step 304 of FIG. 3. If the result of step 304 is positive ("Yes"), then step 306 is performed and the BIOS is updated (e.g., the present BIOS is overwritten by the replacement BIOS). Otherwise, if the result of step 304 is negative ("No"), then an error message can be indicated in step 308, and the method ends, generally, in step 310 as illustrated in FIG. 3. The method 300 of the flash update application 250 can be a method that is implemented in software, in hardware, or in any combination of hardware and software. Similarly, other elements of the present invention can be implemented in hardware, in software, or any combination of hardware and software.

The features and benefits of the present invention can be further illustrated in the following example. It should be noted, however, that the following is but an example, and that alternate embodiments and different applications of the present invention are possible. In this example, the system 100 has been shipped from the factory with the A01 BIOS. Thereafter, a replacement BIOS version (the A02) has been released with additional features, including support for 2GB DIMM's (which is designated as bit 0 of the build capability flags 282, and support for a D0 step central processing unit (with a new microcode update) that is designated as bit 1 of the build capability flags 282. Additional features include support for a new flash part, designated as bit 2 of the build capability flags 282. In this example, the bit values for the present build capability flags 202 of the A01 BIOS 180 would all be set to zero because those new features were unavailable in the original (present) BIOS 180. However, the bit value (typically a 32-bit value) for the replacement build capability flag 282 of the replacement BIOS 280 would have three bits set, one for each of the new features mentioned above. In this example, because there are bit values available for the new features in the present boot capability flags, then a comparison between the present boot capability flags and the replacement build capability flags is possible. Moreover, because the replacement build capability flags in question are set to 1 and the current boot capability flags are set to 0, then the value of the replacement build capability flags is greater than the value of the present boot capability flags and an update of the BIOS is workable.

In yet another example, the customer obtains a new system 100 from the factory with the A02 BIOS 280 and a new flash part (but not the D0 step central processing unit or the 2 GB DIMM's). In this example, the current boot flags 284 would have only the second bit of the three bits set (which would be 0004 h in this example). If the customer tries to back-flash to the A01 BIOS 180, the flash update application 250 would check the current boot capability flags 284 (such as 0004 h) on the A02 BIOS 280 with the build capability flags 202 in the to-be-flashed binary for A01 BIOS 180 (which would read 0000 h in this example). Since the new BIOS 180 does not have the same level of capability as the current BIOS 280 (the bit value for the replacement build flags 282 is less than the bit value for the present boot flags 204), the flash update would be blocked by the flash update application 250 and the application 250 can return the specific error code or diagnostic information to the user.

In yet another example, the customer already has a system that shipped with the A01 BIOS 180 (with no new items installed). The customer updated to the A02 BIOS 280 soon after it was released (again, without adding any of the new items). For some reason, the customer desires to back-flash from updated A02 BIOS 280 to past A01 BIOS 180. With the updated A02 BIOS 280 already installed, the system 100 updated boot capability flags 284 will have a value of, for example, 0000h and the past build capability flags 202 for the to-be-flashed past A01 BIOS 180 will also have a value of 0000h. Hence, the back-flashing from the updated A02 BIOS 280 to the past A01 BIOS 180 will be allowed by the flash update application 250.

The bits for the build capability flags can be cumulative. This means that as future BIOS versions are created with support for additional capabilities, then extra flags (bits) can be added to the build capability flags. While this would appear to make a mismatch between the future BIOS build capability flags (because of the extra bits), it would only be a problem if the values of the build capability flags are set in such a way that, during the update procedure of the BIOS, the update determination check returned a negative ("No") result.

To summarize, the method of the present invention (a) prevents flash updates to older BIOS revisions only when necessary; (b) allows the update utility to flag incompatibility before attempting the flash update; and (c) results in better customer experience because the method does not block global back-flashing of the BIOS. In addition, the capability flags could also be used by other applications to report the addition (or removal) of features in the BIOS to customers, end users, and/or other applications.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having one or more central processing units operative with main memory, said information handling system further comprising:
   a present BIOS operative with said one or more central processing units, said present BIOS having one or more build capability flags and one or more current boot capability flags;
   wherein, when said present BIOS is updated with a replacement BIOS, replacement build capability flags of said replacement BIOS can be compared to said current boot capability flags of said present BIOS to determine if said replacement BIOS can be used in place of said present BIOS.

2. The information handling system according to claim 1, wherein each of said flags form a value.

3. The information handling system according to claim 2, wherein said value is an 8-bit value.

4. The information handling system according to claim 2, wherein said value is a 16-bit value.

5. The information handling system according to claim 2, wherein said value is a 32-bit value.

6. The information handling system according to claim 2, wherein said value is a 64-bit value.

7. The information handling system according to claim 2, wherein said value is a 128-bit value.

8. The information handling system according to claim 2, wherein said replacement BIOS can be used in place of said present BIOS when a value of said replacement build capability flags is greater than a value of said current boot capability flags.

9. The information handling system according to claim 2, wherein said replacement BIOS can be used in place of said present BIOS when a value of said replacement build capability flags is less than a value of said current boot capability flags.

10. The information handling system according to claim 2, wherein said replacement BIOS can be used in place of said present BIOS when a value of said replacement build capability flags is equal to a value of said current boot capability flags.

11. The information handling system according to claim 2, wherein said replacement BIOS can be used in place of said present BIOS when a value of said replacement build capability flags is greater than or equal to a value of said current boot capability flags.

12. The information handling system according to claim 2, wherein said replacement BIOS can be used in place of said present BIOS when a value of said replacement build capability flags is less than or equal to a value of said current boot capability flags.

13. A method of updating a BIOS comprising:
   a) providing a present BIOS having one or more current build capability flags and one or more current boot capability flags;
   b) providing a replacement BIOS having one or more replacement build capability flags and one or more replacement boot capability flags; and
   c) comparing said replacement build capability flags to said current boot capability flags to determine whether said updating is allowed.

14. The method according to claim 13, wherein said current boot capability flags are equated to a current boot capability value.

15. The method according to claim 13, wherein said replacement build capability flags are equated to a replacement build capability value.

16. The method according to claim 15, wherein said updating is allowed when said replacement build capability value is greater than said current boot capability value.

17. The method according to claim 15, wherein said updating is allowed when said replacement build capability value is equal to said current boot capability value.

18. The method according to claim 15, wherein said updating is allowed when said replacement build capability value is less than said current boot capability value.

19. The method according to claim 15, wherein said updating is allowed when said replacement build capability value is greater than or equal to said current boot capability value.

20. The method according to claim 15, wherein said updating is allowed when said replacement build capability value is less than or equal to said current boot capability value.

21. The method according to claim 13, wherein each of said flags are grouped to form a value.

22. The method according to claim 21, wherein said value is a 8-bit value.

23. The method according to claim 21, wherein said value is a 16-bit value.

24. The method according to claim 21, wherein said value is a 32-bit value.

25. The method according to claim 21, wherein said value is a 64-bit value.

26. The method according to claim 21, wherein said value is a 128-bit value.

27. An computer system having one or more central processing units operative with main memory, said information handling system further comprising:

a) present BIOS means having one or more current build capability flags and one or more current boot capability flags;

b) replacement BIOS means having one or more replacement build capability flags and one or more replacement boot capability flags; and c) comparison means for comparing said replacement build capability flags to said current boot capability flags to determine whether said updating is allowed.

* * * * *